US012345183B2

(12) United States Patent
Shibuya et al.

(10) Patent No.: US 12,345,183 B2
(45) Date of Patent: Jul. 1, 2025

(54) HEAD COVER

(71) Applicant: ISUZU MOTORS LIMITED, Yokohama (JP)

(72) Inventors: Kazunari Shibuya, Fujisawa (JP); Ryoma Takara, Fujisawa (JP); Kazuki Kamidaira, Fujisawa (JP); Ayumi Kasai, Fujisawa (JP); Kazuhiro Kitamura, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 0 days.

(21) Appl. No.: 18/664,360

(22) Filed: May 15, 2024

(65) Prior Publication Data

US 2024/0392709 A1 Nov. 28, 2024

(30) Foreign Application Priority Data

May 23, 2023 (JP) ................................ 2023-084372

(51) Int. Cl.
*F01M 11/00* (2006.01)
*F01M 13/04* (2006.01)
*F02F 1/24* (2006.01)
*F02F 7/00* (2006.01)

(52) U.S. Cl.
CPC ............ *F01M 11/00* (2013.01); *F01M 13/04* (2013.01); *F02F 1/24* (2013.01); *F02F 7/006* (2013.01)

(58) Field of Classification Search
CPC .. F01M 11/00; F01M 13/04; F01M 2013/045; F02F 1/24; F02F 7/006; F02F 7/008; F02B 77/13
See application file for complete search history.

(56) References Cited

U.S. PATENT DOCUMENTS

2013/0239922 A1* 9/2013 Festag ................ F01M 13/0416 123/195 C
2014/0238331 A1* 8/2014 Saito ....................... F02F 7/006 123/193.5
2018/0291835 A1* 10/2018 Amano ................... F02B 77/13

FOREIGN PATENT DOCUMENTS

| | | | |
|---|---|---|---|
| CN | 210264947 | U * | 4/2020 |
| JP | S55-146841 | U | 10/1980 |
| JP | H05-060014 | A | 3/1993 |
| JP | H7-042527 | A | 2/1995 |
| JP | 2000-054912 | A | 2/2000 |
| JP | 2000-220549 | A | 8/2000 |
| JP | 2012-002210 | A | 1/2012 |
| JP | 2015-094233 | A | 5/2015 |

* cited by examiner

*Primary Examiner* — Syed O Hasan
(74) *Attorney, Agent, or Firm* — Shih IP Law Group, PLLC

(57) ABSTRACT

A head cover that covers a cylinder head of an engine includes: a support part that is provided on an upper surface of a cover body and supports a weight; and a plurality of upper surface ribs that extend radially from the support part on the upper surface.

10 Claims, 5 Drawing Sheets

HEAD COVER

CROSS-REFERENCE TO RELATED APPLICATIONS

The present application claims priority to Japanese Patent Application number 2023-084372, filed on May 23, 2023 contents of which are incorporated herein by reference in their entirety.

BACKGROUND OF THE INVENTION

The present disclosure relates to a head cover of an engine.

The engine is provided with a head cover that covers an upper surface of a cylinder head. Japanese Unexamined Patent Application Publication No. 2000-54912 discloses a rib connecting two convex portions provided on the head cover's upper surface to prevent vibration.

It has been proposed to place a weight, such as a component for facilitating smooth engine operation, on the head cover's upper surface. In such cases, where the head cover needs to support the weight, enhancing its rigidity becomes desirable. However, the structure disclosed in Japanese Unexamined Patent Application Publication No. 2000-54912 has difficulty in adequately supporting the weight.

BRIEF SUMMARY OF THE INVENTION

Accordingly, the present disclosure has been made in view of these points, and its object is to achieve increased rigidity in a head cover that supports a weight.

An aspect of the present disclosure provides a head cover covering a cylinder head of an engine, the head cover including: a support part that is provided on an upper surface of a cover body and supports a weight; and a plurality of upper surface ribs extending radially from the support part on the upper surface.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

<Configuration of the Head Cover>

A configuration of a head cover according to the present embodiment will be described with reference to FIGS. 1 to 5.

Figure 1:
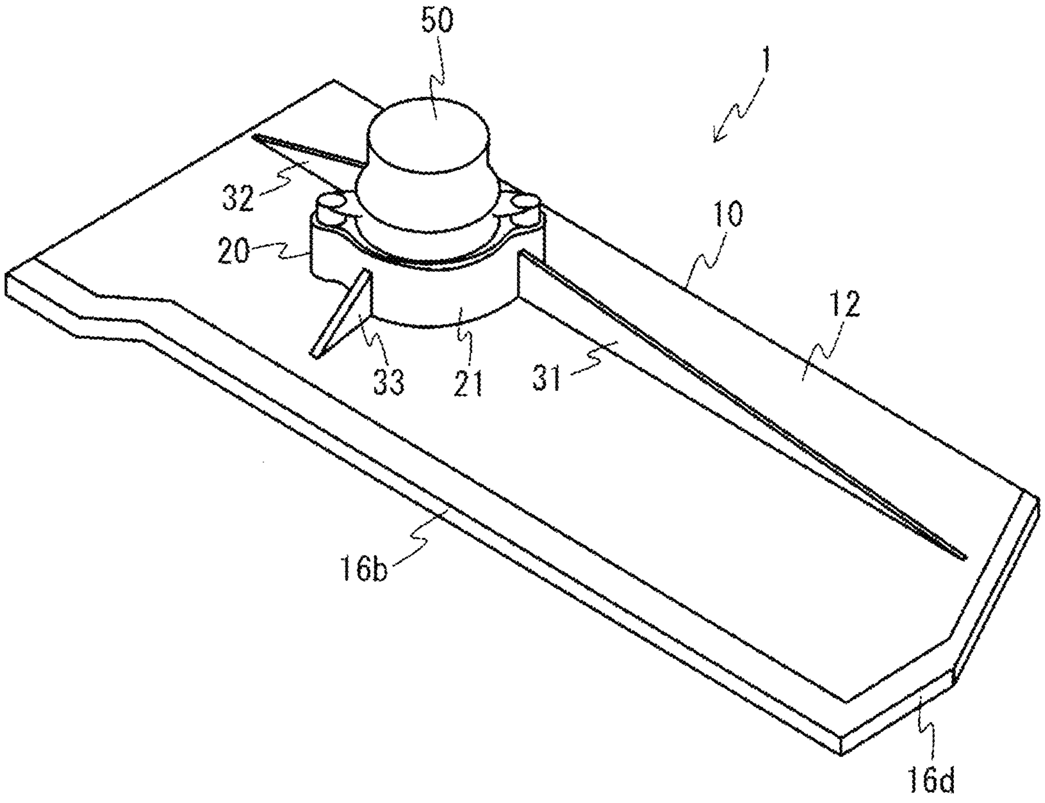
FIG. 1 is a schematic view showing a configuration of a head cover 1.
Figure 2:
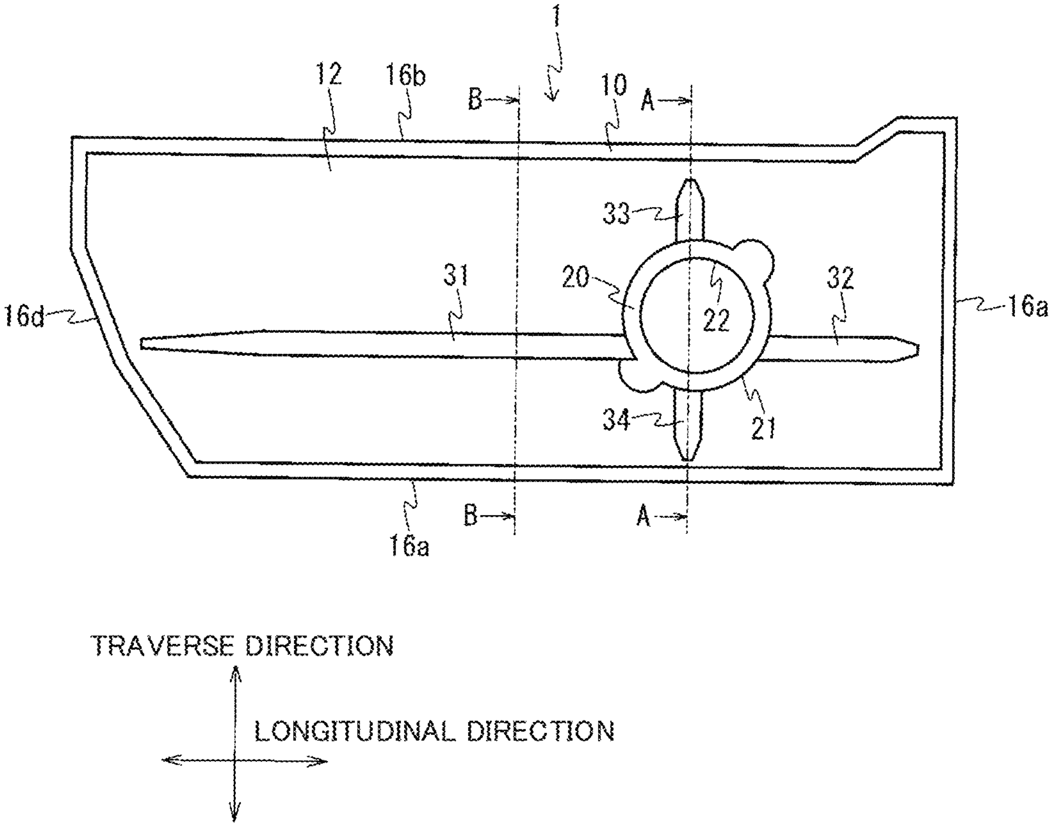
FIG. 2 is a planar view of the head cover 1.
Figure 3:
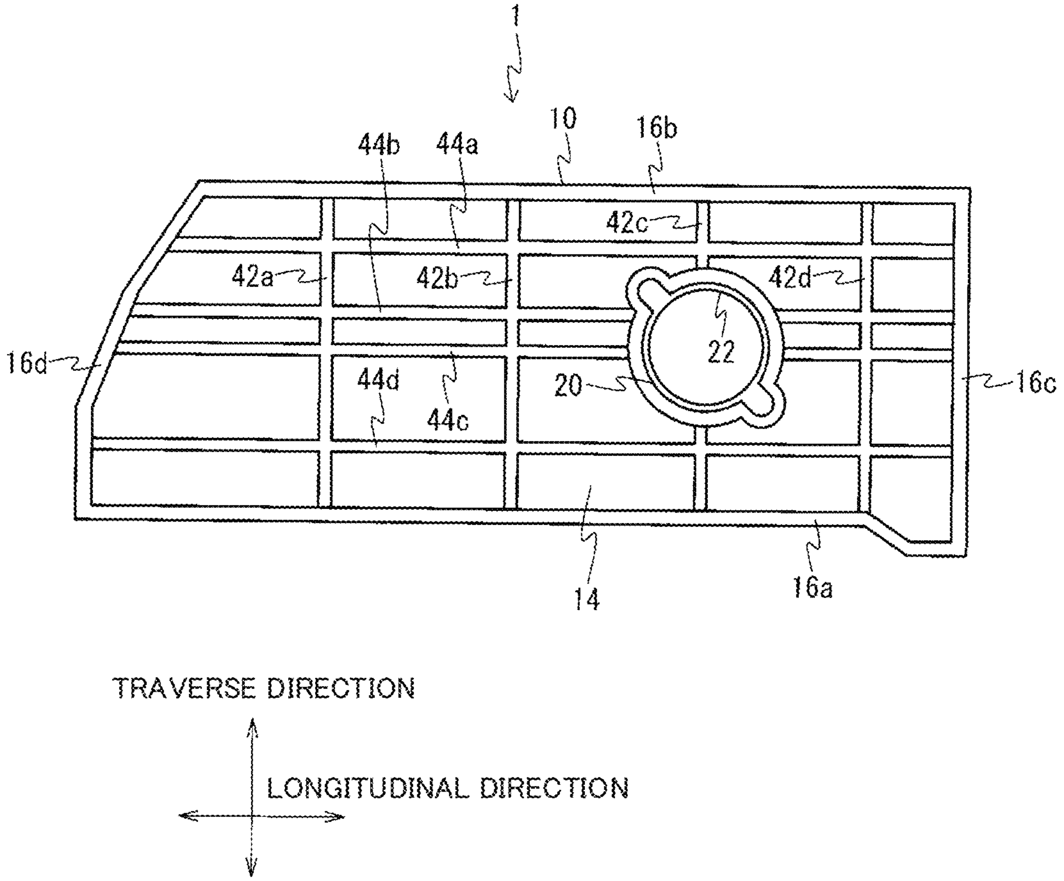
FIG. 3 is a bottom view of the head cover 1.
Figure 4:
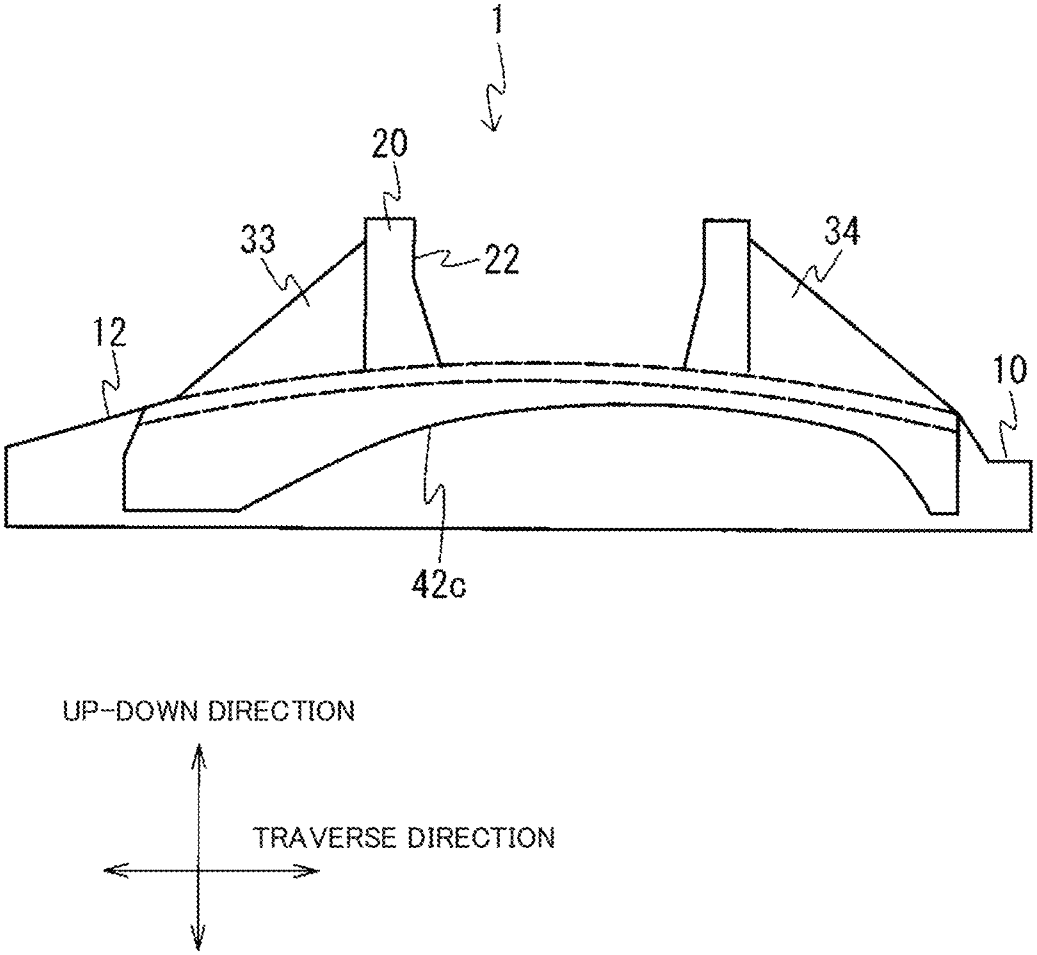
FIG. 4 is a view indicated by view arrows A-A of FIG. 2.
Figure 5:
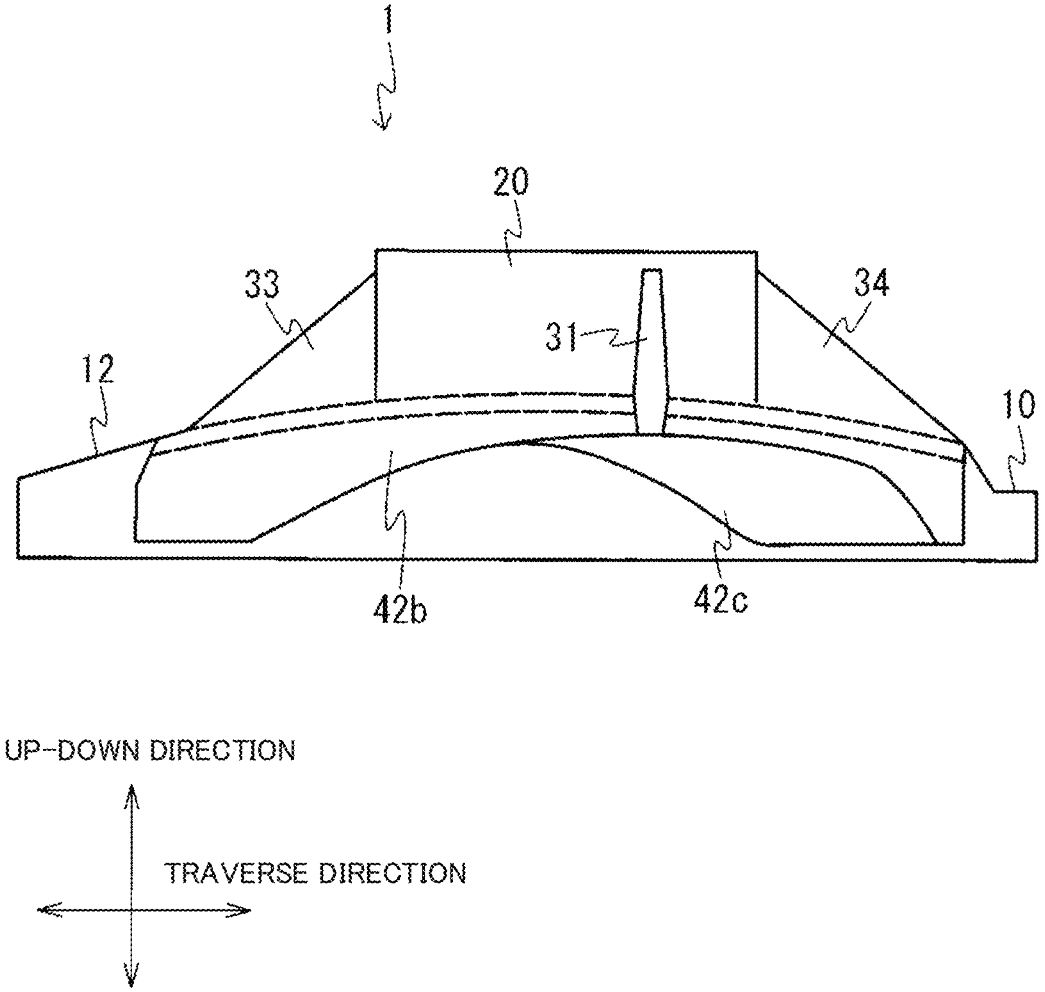
FIG. 5 is a view indicated by view arrows B-B of FIG. 2.

FIG. 1 is a schematic view showing a configuration of a head cover 1. FIG. 2 is a planar view of the head cover 1. FIG. 3 is a bottom view of the head cover 1. FIG. 4 is a view indicated by view arrows A-A of FIG. 2. FIG. 5 is a view indicated by view arrows B-B of FIG. 2. In FIG. 2, a weight 50 is omitted.

The head cover 1 is provided to an engine of a vehicle or the like. The head cover 1 covers a cylinder head of an engine having a plurality of cylinders. Specifically, the head cover 1 covers a valve train (a mechanism for opening and closing an intake valve and an exhaust valve) provided to the cylinder head. The head cover 1 has a function of reducing the operating noise of a piston in the engine and combustion noise in a combustion chamber.

As shown in FIG. 1, the weight 50 can be placed on the head cover 1. The weight 50 is an oil separator, as an example. The oil separator is a device for separating gas (air or gas) that has infiltrated into lubricating oil of the engine. Although details will be described later, the head cover 1 of the present embodiment has a structure capable of achieving increased rigidity in the head cover 1 on which the weight 50 is placed.

As shown in FIGS. 1 and 2, the head cover 1 includes a cover body 10, a support part 20, and upper surface ribs 31 to 34.

The cover body 10 is a portion constituting the main body of the head cover 1, and is formed in a rectangular flat plate shape. Here, the cover body 10 is a casting. The weight 50 is placed on an upper surface 12 of the cover body 10. A back surface 14 that opposes the upper surface 12 covers the cylinder head. As shown in FIG. 3, the back surface 14 is surrounded by sidewalls **16*a* to 16*d*. The sidewalls 16*a* to 16*d* are formed such that they protrude in the normal direction of the back surface 14 (specifically, the direction from the page of FIG. 3** toward the front).

The support part 20 is a pedestal on which the weight 50 is placed, and supports the weight 50. As shown in FIG. 1, the support part 20 is provided on the upper surface 12 of the cover body 10. Specifically, as shown in FIG. 2, the support part 20 is positioned at the center in a traverse direction on the upper surface 12. Here, the support part 20 is formed in a cylindrical shape and protrudes from the upper surface 12. The height of the support part 20 is greater than the thickness of the cover body 10. The support part 20 is integrally formed with the cover body 10. A hole at the center of the cylindrical support part 20 also penetrates through the cover body 10. Further, the support part 20 protrudes from the back surface 14 in the normal direction (see FIG. 3).

As shown in FIG. 2, the upper surface ribs 31 to 34 are ribs extending radially from the support part 20 on the upper surface 12. That is, the upper surface ribs 31 to 34 are formed such that they contact the upper surface 12 and an outer peripheral surface 21 of the support part 20. The upper surface ribs 31 to 34 are formed in a flat plate shape. The heights of the upper surface ribs 31 to 34 are lower than the height of the support part 20.

As shown in FIG. 2, the upper surface ribs 31 and 32 extend parallel to a longitudinal direction of the head cover 1 from the support part 20. The upper surface rib 31 extends from the support part 20 to one end in the longitudinal direction of the upper surface 12. The upper surface rib 32 extends from the support part 20 to the other end in the longitudinal direction of the upper surface 12.

As shown in FIG. 2, the upper surface ribs 33 and 34 extend parallel to the traverse direction (orthogonal direction), which is orthogonal to the longitudinal direction, from the support part 20. The upper surface rib 33 extends from the support part 20 to one end in the traverse direction of the upper surface 12. The upper surface rib 34 extends from the support part 20 to the other end in the traverse direction of the upper surface 12. Therefore, the four upper surface ribs 31 to 34 are provided at 90-degree intervals in the circumferential direction of the support part 20.

As described above, it is possible to increase the rigidity of the cover body 10 by providing the upper surface ribs 31 to 34 extending from the support part 20 such that they become orthogonal to each other. Therefore, even though the weight 50 is placed on the support part 20, it is possible to prevent deformation of the cover body 10 caused by a load from the weight 50. Further, the upper surface ribs 31 to 34 extending from the support part 20 to the ends on the upper surface 12 make it possible to increase the rigidity of the cover body 10 across a wide range.

The upper surface ribs 31 to 34 are formed such that the heights of the upper surface ribs 31 to 34 become greater as they get closer to the support part 20. Specifically, the upper surface ribs 31 to 34 are inclined such that their heights decrease as they extend farther from the support part 20. Here, the upper surface ribs 31 to 34 may be inclined such that their heights decrease at a constant angle. That is, the upper surface ribs 31 to 34 have a triangular shape as shown in FIG. 1.

Normally, in the cover body 10, as a portion gets closer to the weight 50, a bending moment to deform the cover body 10 increases due to the inertial force of the weight 50 caused by the vibration of the engine. In such a case, the upper surface ribs 31 to 34 formed in the above-described triangular shape can increase the rigidity of portions of the cover body 10 where the bending moment is large. As a result, it is possible to prevent deformation of the cover body 10 due to the weight 50.

It should be noted that the heights of the upper surface ribs 31 to 34 decrease as they extend farther from the support part 20 in the above description, but the present embodiment is not limited to this. For example, the heights of the upper surface ribs 31 to 34 may be constant. Further, although the four upper surface ribs 31 to 34 are provided on the upper surface 12 in the above description, the present embodiment is not limited to this. For example, three upper surface ribs or five or more upper surface ribs may be provided on the upper surface 12. Further, although the four upper surface ribs 31 to 34 (a plurality of upper surface ribs) are provided at regular intervals in the circumferential direction in the above description, the present embodiment is not limited to this. For example, the plurality of upper surface ribs may be provided at irregular intervals.

In the present embodiment, in addition to the upper surface ribs 31 to 34, back surface ribs are provided also on the back surface 14 that opposes the upper surface 12. The back surface ribs are formed at predetermined intervals on the back surface 14. As shown in FIG. 3, first back surface ribs 42*a* to 42*d* and second back surface ribs 44*a* to 44*d* are provided as the back surface ribs.

As shown in FIG. 3, the first back surface ribs 42*a* to 42*d* are formed at predetermined intervals in the longitudinal direction. The first back surface ribs 42*a* to 42*d* are ribs parallel to the traverse direction. The first back surface ribs 42*a* to 42*d* extend from one end to the other end in the traverse direction of the back surface 14. Specifically, the first back surface ribs 42*a* to 42*d* are formed such that they connect a sidewall 16*a* on the one end side and a sidewall 16*b* on the other end side in the traverse direction. The first back surface rib 42*c* among the four first back surface ribs 42*a* to 42*d* is formed at a position passing through the support part 20 in the traverse direction.

On the basis of simulation results, the first back surface ribs 42*a* to 42*d* are provided at portions where the cover body 10 is likely to deform.

As shown in FIG. 3, the second back surface ribs 44*a* to 44*d* are formed at predetermined intervals in the traverse direction. The second back surface ribs 44*a* to 44*d* are ribs parallel to the longitudinal direction. The second back surface ribs 44*a* to 44*d* extend from one end to the other end in the longitudinal direction of the back surface 14. Specifically, the second back surface ribs 44*a* to 44*d* are formed such that they connect a sidewall 16*c* on the one end side and a sidewall 16*d* on the other end side in the longitudinal direction. The second back surface ribs 44*b* and 44*c* among the four second back surface ribs 44*a* to 44*d* are formed at positions passing through the support part 20 in the longitudinal direction.

As shown in FIG. 3, the first back surface ribs 42*a* to 42*d* and the second back surface ribs 44*a* to 44*d* intersect each other. Specifically, the first back surface ribs 42*a* to 42*d* and the second back surface ribs 44*a* to 44*d* are orthogonal to each other in a manner to divide the back surface 14 into a grid. Dividing the back surface 14 into a grid makes it possible to subdivide the back surface 14 (divide into small regions). As a result, in a case where the head cover 1 vibrates to amplify combustion noise or the like, the head cover 1 vibrates in subdivided regions, thereby reducing noise or adjusting the noise frequency.

Some ribs among the first back surface ribs 42*a* to 42*d* and the second back surface ribs 44*a* to 44*d* are formed at the same positions as the upper surface ribs 31 to 34 when the head cover 1 is viewed in a plane. In other words, some ribs among the first back surface ribs 42*a* to 42*d* and the second back surface ribs 44*a* to 44*d* are positioned just behind the upper surface ribs 31 to 34, sandwiching the cover body 10. Specifically, the first back surface rib 42*c* is formed at the same position as the upper surface ribs 33 and 34. Also, the second back surface rib 44*c* is formed at the same position as the upper surface ribs 31 and 32. Further, the first back surface rib 42*c* is connected to the upper surface ribs 33 and 34 via the cover body 10, and the second back surface rib 44*c* is connected to the upper surface ribs 31 and 32 via the cover body 10. This makes it possible to increase the cross-sectional secondary moment of the first back surface rib 42*c* and the upper surface ribs 33 and 34, and the cross-sectional secondary moment of the second back surface rib 44*c* and the upper surface ribs 31 and 32. As a result, it is possible to prevent bending of the cover body 10 effectively.

In the present embodiment, the heights of the second back surface ribs 44*a* to 44*d* are constant, but the heights of the first back surface ribs 42*a* to 42*d* are not constant. The heights of the first back surface ribs 42*a* to 42*d* are lower at the center in the traverse direction and higher at their ends in the traverse direction. Specifically, the first back surface ribs 42*a* to 42*d* are formed in an arch shape as shown in FIGS. 4 and 5. Forming the first back surface ribs 42*a* to 42*d* in an arch shape can prevent the first back surface ribs 42*a* to 42*d* from interfering with a valve mechanism or the like provided to the cylinder head.

Further, forming the first back surface ribs 42*a* to 42*d* in an arch shape gives the following effects.

In a case where the heights of the first back surface ribs 42*a* to 42*d* are constant, unlike the present embodiment, a vertical load received by the cover body 10 from the weight 50 is transmitted to the first back surface ribs 42*a* to 42*d* as the load of the bending moment. This induces flexural deformation of the cover body 10, causing the cover body 10 to become the source of noise.

In contrast, in a case where the first back surface ribs 42*a* to 42*d* are in an arch shape as described in the present embodiment, a vertical load received by the cover body 10 from the weight 50 is converted into compressive force (or tensile force) in the longitudinal direction of the cover body 10. As a result, it is possible to prevent flexural deformation of the cover body 10 that generates noise. In other words, it is possible to reduce noise caused by flexural deformation of the cover body 10.

The first back surface ribs 42*a* to 42*d* and the second back surface ribs 44*a* to 44*d* are integrally formed with the cover body 10, but the present embodiment is not limited to this. For example, the first back surface ribs 42*a* to 42*d* and the second back surface ribs 44*a* to 44*d* may be separate members from the cover body 10, and may be fixed to the cover body 10.

Effects of the Present Embodiment

The head cover 1 of the above-described embodiment includes the support part 20 that is provided on the upper surface 12 of the cover body 10 and supports the weight 50, and the plurality of upper surface ribs 31 to 34 that extend radially from the support part 20 on the upper surface 12.

Providing the upper surface ribs 31 to 34 extending radially from the support part 20 can increase the rigidity of the cover body 10. Therefore, even though the weight 50 is placed on the support part 20, the cover body 10 having high strength can prevent deformation of the cover body 10 due to a load from the weight 50.

The present disclosure is explained on the basis of the exemplary embodiments. The technical scope of the present disclosure is not limited to the scope explained in the above embodiments and it is possible to make various changes and modifications within the scope of the invention. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. A head cover covering a cylinder head of an engine, the head cover comprising:

a support part that protrudes from an upper surface of a cover body that is formed in a flat plate and supports a weight; and four upper surface ribs extending radially from an outer peripheral surface of the support part on the upper surface such that the four upper surface ribs become orthogonal to each other, the four upper surface ribs contact both the outer peripheral surface and the upper surface.

2. The head cover according to claim 1, wherein each upper surface rib is inclined such that a height of the upper surface rib decreases as the upper surface rib extends farther from the support part.

3. The head cover according to claim 1, wherein the support part is provided in a cylindrical shape protruding in a normal direction of the upper surface, and each upper surface rib is in contact with both the outer peripheral surface of the support part and the upper surface.

4. The head cover according to claim 1, wherein the four upper surface ribs include:

two ribs extending parallel to a longitudinal direction of the head cover from the support part, and two ribs extending parallel to an orthogonal direction, which is orthogonal to the longitudinal direction, from the support part.

5. The head cover according to claim 1, further comprising:

a plurality of back surface ribs formed at predetermined intervals on a back surface that opposes the upper surface.

6. The head cover according to claim 5, wherein the support part protrudes in a normal direction of the back surface, and the plurality of back surface ribs include back surface ribs passing through the support part.

7. The head cover according to claim 5, wherein the plurality of back surface ribs include a plurality of first back surface ribs formed at predetermined intervals in a longitudinal direction.

8. The head cover according to claim 7, wherein the plurality of back surface ribs include a plurality of second back surface ribs that are formed at predetermined intervals in an orthogonal direction, which is orthogonal to the longitudinal direction, and intersect the first back surface ribs.

9. The head cover according to claim 8, wherein a height of each second back surface rib is lower at a center in the orthogonal direction and higher at its ends of the second back surface rib in the orthogonal direction.

10. The head cover according to claim 5, wherein each back surface rib is formed at the same position as an upper surface rib, among the plurality of upper surface ribs, when the head cover is viewed in a plane, and is connected to the upper surface rib via the cover body.

* * * * *